(12) United States Patent
Bivens et al.

(10) Patent No.: US 9,811,281 B2
(45) Date of Patent: Nov. 7, 2017

(54) MULTI-TENANT MEMORY SERVICE FOR MEMORY POOL ARCHITECTURES

(71) Applicant: International Business Machines Corporation, Armonk, NY (US)

(72) Inventors: John Alan Bivens, Ossining, NY (US); Koushik K. Das, New York, NY (US); Min Li, San Jose, CA (US); Ruchi Mahindru, Elmsford, NY (US); Harigovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/092,699

(22) Filed: Apr. 7, 2016

(65) Prior Publication Data

US 2017/0293447 A1 Oct. 12, 2017

(51) Int. Cl.
 *G06F 12/00* (2006.01)
 *G06F 12/08* (2016.01)
 (Continued)

(52) U.S. Cl.
 CPC .......... *G06F 3/0631* (2013.01); *G06F 3/064* (2013.01); *G06F 3/065* (2013.01); *G06F 3/067* (2013.01);
 (Continued)

(58) Field of Classification Search
 CPC ......... G06F 12/00; G06F 12/084; G06F 13/00
 (Continued)

(56) References Cited

U.S. PATENT DOCUMENTS 7,529,785 B1 5/2009 Spertus et al.
7,818,535 B1 * 10/2010 Bono ................. G06F 12/0868
 711/173
(Continued)

FOREIGN PATENT DOCUMENTS

CN 105094985 11/2015

OTHER PUBLICATIONS

Abali et al, "Disaggregated and optically interconnected memory: when will it be cost effective?," Mar. 3, 2015.
(Continued)

*Primary Examiner* — Tuan Thai
(74) *Attorney, Agent, or Firm* — Jeffrey S. LaBaw; David H. Judson

(57) ABSTRACT

A memory management service occupies a configurable portion of an overall memory system in a disaggregate compute environment. The service provides optimized data organization capabilities over the pool of real memory accessible to the system. The service enables various types of data stores to be implemented in hardware, including at a data structure level. Storage capacity conservation is enabled through the creation and management of high-performance, re-usable data structure implementations across the memory pool, and then using analytics (e.g., multi-tenant similarity and duplicate detection) to determine when data organizations should be used. The service also may re-align memory to different data structures that may be more efficient given data usage and distribution patterns. The service also advantageously manages automated backups efficiently.

19 Claims, 9 Drawing Sheets

(51) Int. Cl.
*G06F 3/06* (2006.01)
*G06F 12/0808* (2016.01)

(52) U.S. Cl.
CPC .......... *G06F 3/0619* (2013.01); *G06F 3/0653* (2013.01); *G06F 12/0808* (2013.01); *G06F 2212/62* (2013.01)

(58) Field of Classification Search
USPC .................................. 711/100, 135, 154, 170
See application file for complete search history.

(56) References Cited

U.S. PATENT DOCUMENTS

| | | |
|---|---|---|
| 8,935,506 B1 | 1/2015 | Gopalan |
| 8,954,698 B2 | 2/2015 | Schenfeld et al. |
| 2004/0230762 A1 | 11/2004 | Allen et al. |
| 2010/0205381 A1 | 8/2010 | Canion |
| 2011/0302377 A1 | 12/2011 | Elko et al. |
| 2012/0001925 A1* | 1/2012 | Andonieh ............. G06F 9/5083 345/502 |
| 2012/0079499 A1* | 3/2012 | Gold ..................... G06F 3/0607 718/105 |
| 2013/0036091 A1 | 2/2013 | Provenzano et al. |
| 2014/0007239 A1* | 1/2014 | Sharpe .................. G06F 21/561 726/24 |
| 2015/0186069 A1 | 7/2015 | Sharma et al. |
| 2015/0227600 A1 | 8/2015 | Ramu et al. |
| 2016/0321008 A1* | 11/2016 | Fang ....................... G06F 3/061 |
| 2016/0380905 A1* | 12/2016 | Wang ..................... H04L 47/70 709/226 |
| 2017/0003997 A1* | 1/2017 | Kelly .................. G06F 9/45558 |

OTHER PUBLICATIONS

International Search Report, PCT/IB2017/051381, dated Jun. 22, 2017.

* cited by examiner

MULTI-TENANT MEMORY SERVICE FOR MEMORY POOL ARCHITECTURES

BACKGROUND OF THE INVENTION

Technical Field

This disclosure relates generally to data processing systems in a data center operating environment.

Background of the Related Art

A well-known information technology (IT) delivery model is cloud computing, by which shared resources, software and information are provided over the Internet to computers and other devices on-demand. Cloud computing significantly reduces IT costs and complexities while improving workload optimization and service delivery. With this approach, an application instance is hosted and made available from Internet-based resources that are accessible, e.g., through a conventional Web browser over HTTP. Cloud compute resources typically are housed in large server farms that run one or more network applications, typically using a virtualized architecture wherein applications run inside virtual servers, or so-called "virtual machines" (VMs), that are mapped onto physical servers in a data center facility.

Within the data center itself, a data center network typically is architected according to a hierarchical design comprising several layers of electrical switches, namely, access, aggregate and core layers. At a front end of the data center, content and load balancing switches are connected to the Internet through gateway routers, while at the back end, they are linked to core switches. Typically, the core switches are linked to aggregate switches, and the aggregate switches are connected to rack switches. Each rack switch is connected to the servers in the rack. The switches in the data center network operate usually over an electronic switch fabric, and the links between them either are copper cables or optical fibers. When a request comes from the external network, it first comes to the load balancing and content switches, which route the request to the appropriate servers. To fulfil the request, the servers can coordinate with other servers within the same or different racks. For example, the application servers can coordinate with the database servers to process the request. After completing the request, the response is sent to the external network through the gateway routers.

Conventional data center architectures such as described face many challenges including, without limitation, scalability, fault tolerance and energy efficiency. Due to these challenges, many data center architectures are hard-pressed to handle the growing demand of cloud computing. Moreover, because servers (and, in particular, their memory) are managed independently, these architectures have significant inefficiencies with respect to memory management, duplication of data, and inefficient memory allocations.

It is known in the prior to provide for a "memory pool" that can be accessed and used by other processing resources in the data center to act as an extended memory. These approaches are designed to facilitate copy schemes. Such schemes copy or page chunks of memory from the extended memory to a smaller memory directly placed and attached to processors on a processing blade. This direct and fixed memory, however, prevents the switching as a whole the memory content of different instances, as it creates a performance problem because delays associated with a paging mechanism can interfere with some codes.

It would be desirable to implement and manage a memory pool to address the inefficiencies associated with these and other prior art approaches.

BRIEF SUMMARY

A "disaggregated server" architecture is enhanced by providing a memory management service. In the disaggregated server approach, similar types of server resources in the data center are aggregated in respective pools, such as a compute pool, a memory pool, and a storage pool. A server is then constructed dynamically by allocating from the pools appropriate amounts of resources to meet the requirements of a tenant's workload. The disaggregated server approach provides higher resource utilization as compared to conventional data center architectures, as memory components can be used, re-used or shared among different tenants and processing components. According to this disclosure, memory is managed independently of the other system components, thus providing opportunities to create unique management capabilities that can provide significant benefits.

According to a first aspect of this disclosure, a method is provided for managing memory in a multi-tenant compute environment. The method begins by providing a memory resource pool. For a given workload, memory resources from the memory resource pool are allocated to a set of processors. Data for the given workload is organized in the allocated memory resources according to a data structure, such as a hash table, linked list, or the like. As the workload is processed, the method then determines (e.g., based on analytics) whether re-organization of the data in the data structure for the given workload would increase performance of or conserve memory used by the data structure. Upon a determination that re-organization would increase performance of or conserve memory, a given memory management action is then taken to manage the data.

According to a second aspect of this disclosure, an apparatus for assigning resources in a compute environment is described. The apparatus comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for assigning resources in a compute environment is described. The computer program product holds computer program instructions executed in the data processing system and operative to perform operations such as the steps described above.

According to a fourth aspect of this disclosure, a data center facility is described. The data center comprises a memory pool, an optical interconnect, and a memory manager. The memory manage executes in a hardware element and is operative to manage allocation of memory resources from the memory resource pool to a set of processors for multiple tenant workloads. The manager also is operative to organize data for a given tenant workload according to a data structure, and to selectively re-organize the data in the data structure to increase performance of the data structure and reduce memory required to service the given tenant workload.

The memory service of this disclosure preferably occupies some configurable portion of the overall memory system, leaving the rest free for typical high-performance load-store operations. The service provides optimized data organization capabilities over the pool of real memory already accessible to the system. To this end, the memory service provides for the capability to implement certain types of data stores in hardware, including at the data structure level. In an embodiment, the memory service provides for data structure performance management and storage capacity conservation by enabling the creation and management of high-performance, re-usable data structure implementations across the memory pool, as well as the capability of using various analytics (e.g., multi-tenant similarity, duplicate detection, and the like) to determine if and when the data organizations are worth doing. Thus, the service preferably leverages and reduces capacity needs through similarity and duplicate detection in the data structure (even between workloads) to save memory space. When desirable, the service may also alter or adjust the data structure itself, e.g., based on monitored data usage patterns or data distributions to continually improve data structure performance. A further feature is the ability to provide for automated backups, preferably without requiring data copies to pass through hardware processors.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system environment wherein a "disaggregated server"—sometimes referred to herein as a "server entity"—is composed or constitutes server resources selected from (or assigned from) shared server resource pools, namely, one or more of: a compute pool, a memory pool, an accelerator (e.g., GPU accelerator, network accelerator, etc.) pool, a storage pool, and so forth. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, and as now described below, a disaggregated compute system in which the teachings of this disclosure are practiced utilizes optical (as opposed to electrical) interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.
Switching Optically-Connected Memory Architecture By way of background, but not by way of limitation, the following describes a representative computer environment in which the techniques of this disclosure (described below) may be practiced.

Figure 1:
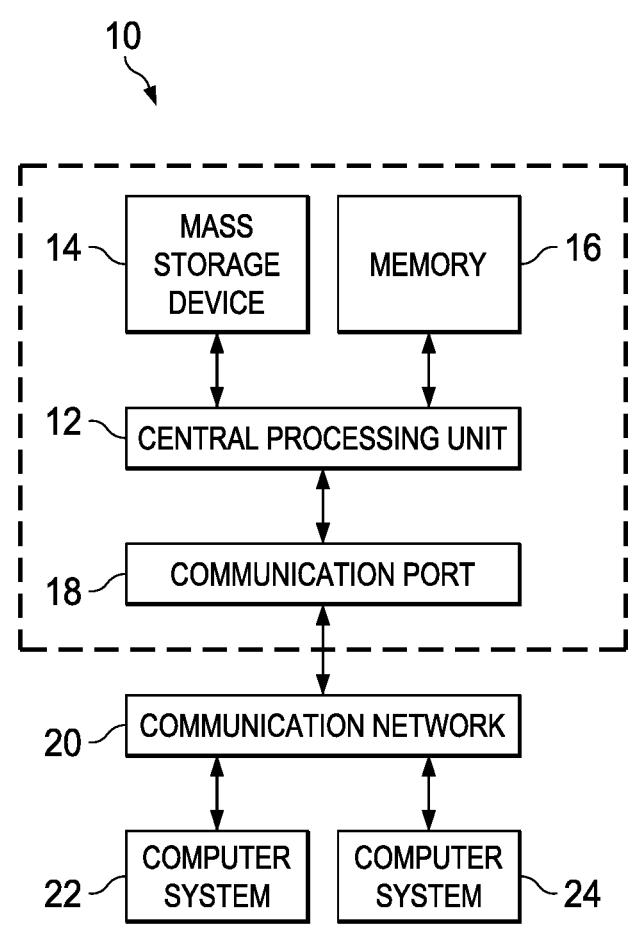
FIG. 1 depicts an exemplary block diagram illustrating a computing system environment in which exemplary aspects of the disclosure may be implemented.

Turning now to FIG. 1, exemplary architecture 10 of a computing environment in which the disaggregated compute system of this disclosure may be implemented is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
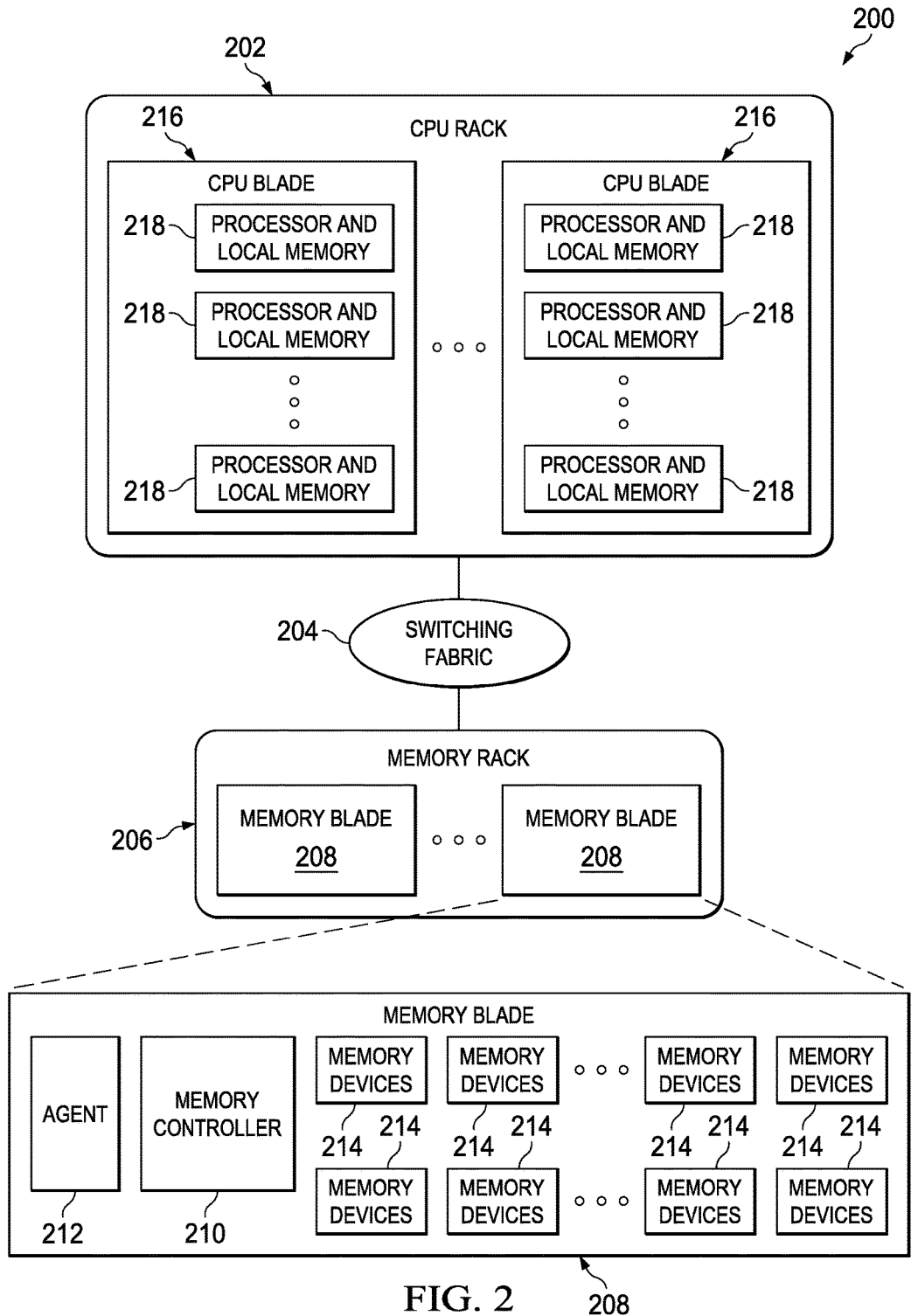
FIG. 2 is an exemplary block diagram of a hardware structure of an optically-connected memory system in which aspects of the illustrative embodiments may be implemented.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an Optically-Connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch 204 that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In the preferred architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically-connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310*a-n*, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
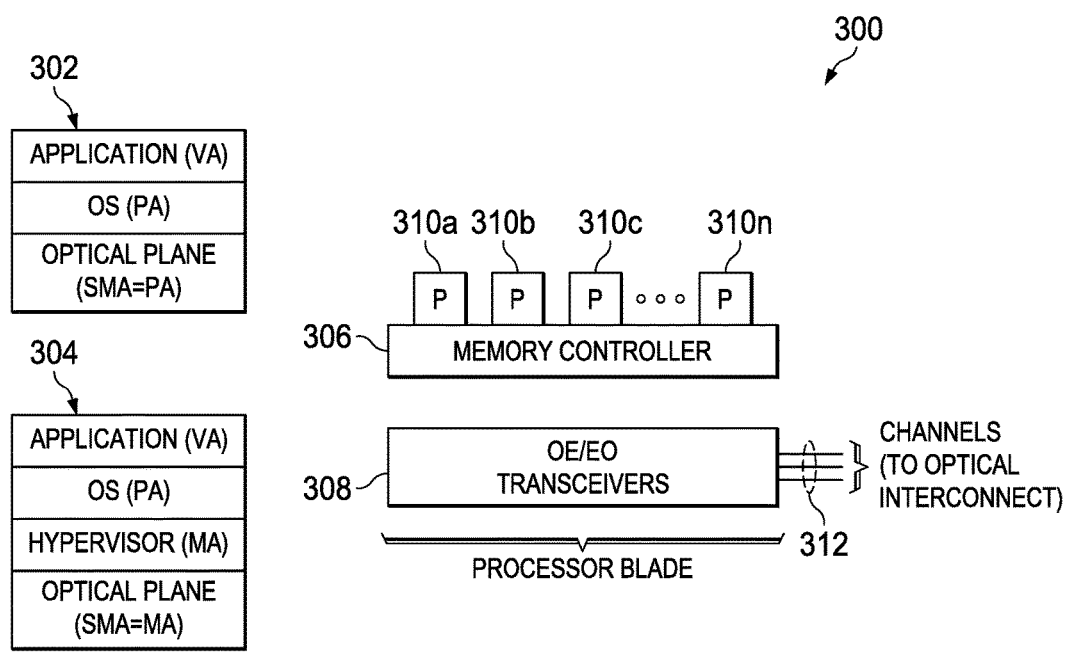
FIG. 3 depicts a block diagram illustrating a hardware structure of a processor design in the optically-connected memory system in FIG. 2.
Figure 4:
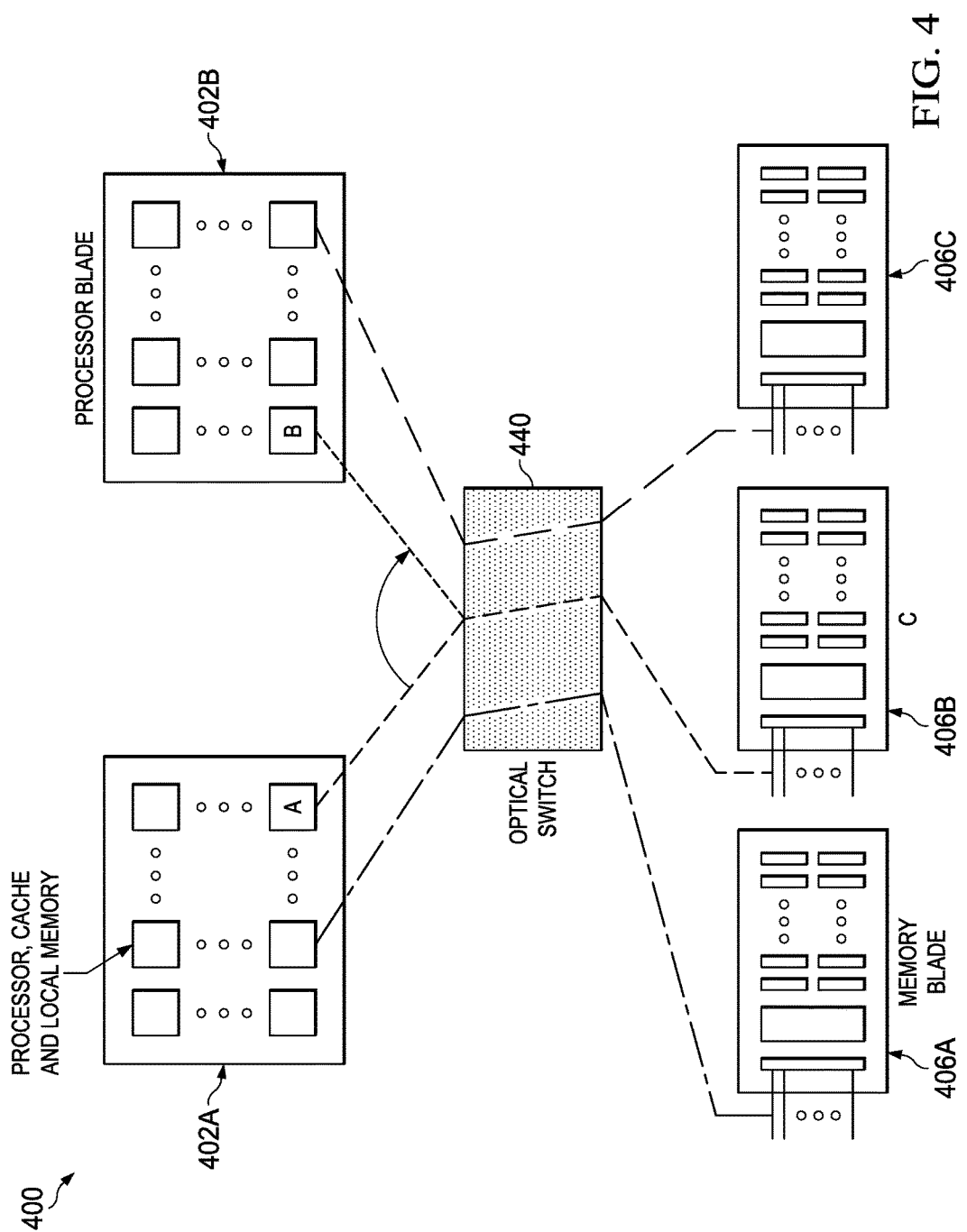
FIG. 4 is a block diagram illustrating a hardware structure for accessing memory at the processor.

Turning now to FIG. 3, FIG. 3 is a block diagram 300 showing a hardware structure of a processor design in the optically-connected memory system in a computer system. As illustrated in FIG. 3, the processor side design 300 illustrates: software stack in system (without virtualization) 302 and 304 (with virtualization), and the processor blade communicates with remote memory blades through optical transceiver 308 and 312. There is a memory controller 306 associated with local memory pool 310*a-n*. If a System Memory Address (SMA) space (as shown in 302 and 304 of FIG. 3) is above a certain, predefined limit, the SMA is mapped to a Remote Memory Address (RMMA) space 408 (as shown in FIG. 4) and the access request is routed to the remote memory blade through the proper channels. It should be noted that the memory blade 208 (see FIG. 2) maintains a separate address space called Remote Memory Address (RMMA) space.

In an optically-connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/Optical-to-Electrical (OE) transceivers 312 which are connected to, for example, a Northbridge™ chipset. Note that in a virtualized system the SMA (as shown in 302 and 304 of FIG. 3) corresponds to the Machine Address (MA) (as shown in 302 and 304), and in a system without virtualization the SMA (as shown in 302 and 304 in FIG. 3) corresponds to the physical address (PA) (as shown in 302 and 304 of FIG. 3). As shown in the FIG. 3, each processor blade (shown with components 306, 308, and 310a-n) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

In an optically-connected system (as seen in FIG. 2 200), processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 402A and 402B) can allocate memory from a remote memory blade by initiating a circuit with the memory blade 406 (shown as 406A-C) and sending the memory request to the remote memory controller. In such a memory system, a processor node 402 holding super pages within a remote memory blade can signal another processor to establish a circuit with the remote memory blade 406 (shown as 406A-C) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406A-C) if it no longer requires any super pages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively.

While the above-described compute environment is preferred, it is not intended to be limiting. Aspects of the disaggregated compute system of this disclosure may be implemented in a data center that provides a conventional cloud computing model of service delivery. Thus, for completeness, the following section provides additional details regarding cloud computing.

Cloud Computing

Cloud computing enables convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 5:
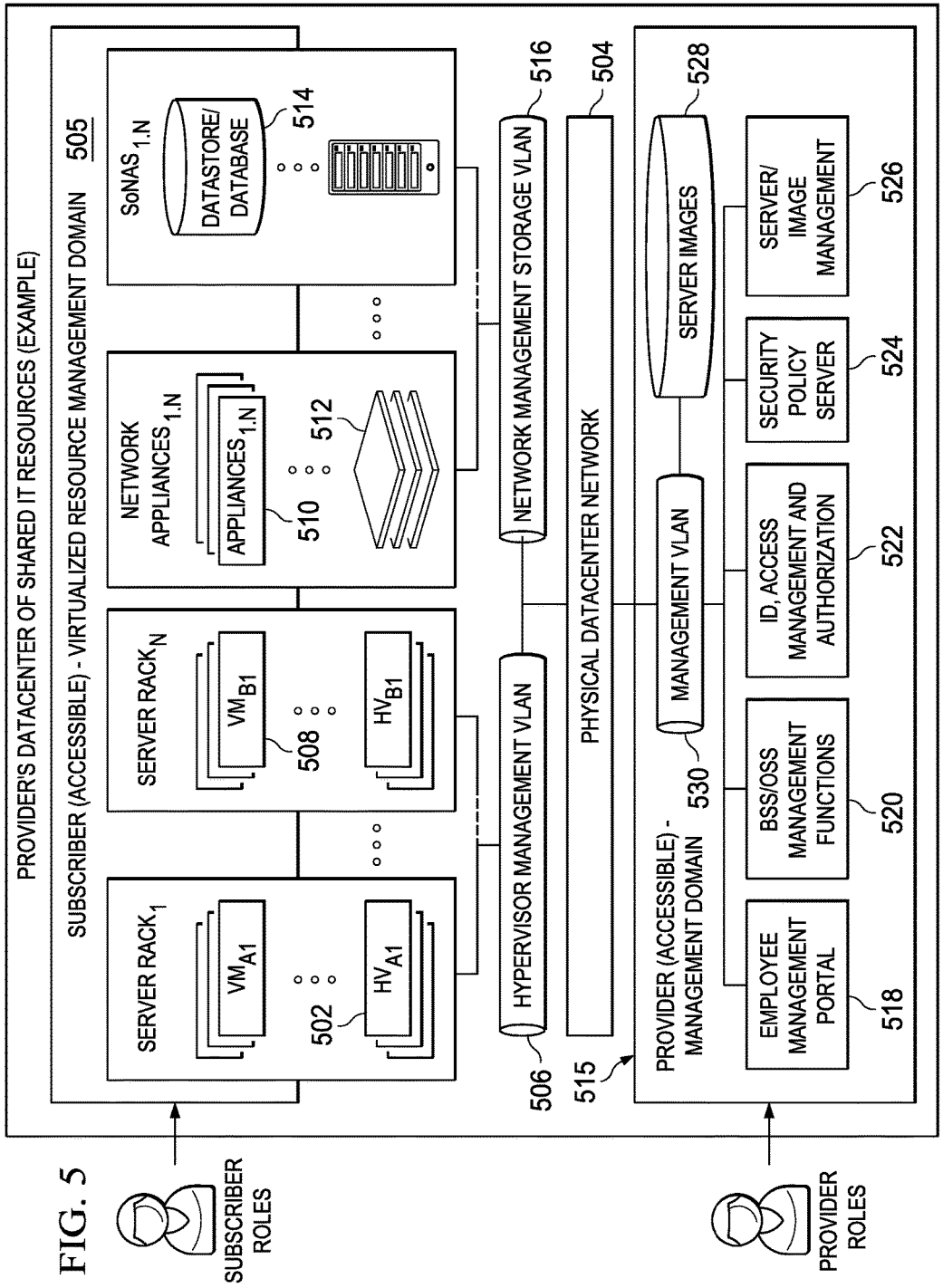
FIG. 5 depicts a disaggregated compute system according to this disclosure.

FIG. 5 illustrates a typical IT infrastructure that supports virtualization of resources and in which the below-described techniques of this disclosure also may be implemented in whole or in part. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 5, an example virtual machine hosting environment (alternately referred to herein as a data center or "cloud") is illustrated. This environment comprises host machines (HVs) 502 (e.g., servers or like physical machine computing devices) connected to a physical datacenter network 504, typically via a hypervisor management VLAN 506. Although not depicted explicitly, typically the environment also includes load balancers, network data switches (e.g., top-of-rack switches), firewalls, and the like. As shown in FIG. 5, physical servers 502 are each adapted to dynamically provide one or more virtual machines (VMs) 508 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 510 are hosted in network appliances 512, and tenant data is stored in data stores and databases 514. The applications and data stores are connected to the physical datacenter network 504, typically via a network management/storage VLAN 516. Collectively, the virtual machines, applications and tenant data represent a subscriber-accessible virtualized resource management domain 505. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 515. This domain comprises a provider employee management portal 518, the BSS/OSS management functions 520, various identity and access management functions 522, a security policy server 524, and management functions 526 to manage the server images 528. These functions interface to the physical datacenter network via a management VLAN 530. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

Disaggregate Compute System

With the above description providing several representative operating environments, a disaggregate compute system operating within a hardware cloud environment is now described in further detail. As noted above, a disaggregate compute system is one in which server resources in or across the data center are "disaggregated" into shared server resource pools, namely, one or more of: a compute pool, a memory pool, an accelerator pool, a storage pool, and the like. Servers are constructed dynamically, for example, on-demand and based on workload requirements, by allocating from these resource pools. A disaggregated compute system of this type keeps track of resources that are available in the shared server resource pools, and manages those resources based on that information.

Figure 6:
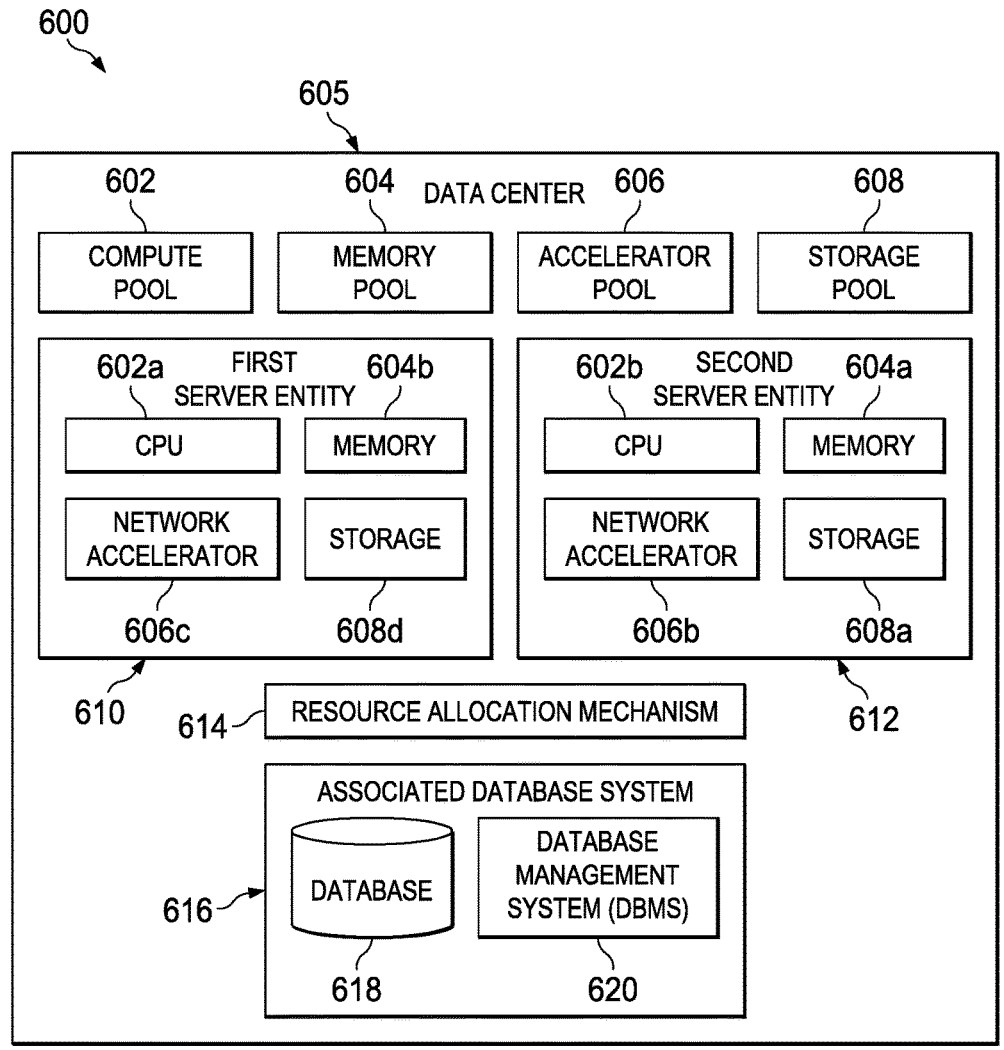
FIG. 6 depicts an alternative data center architecture in which the techniques of this disclosure may be implemented.

A representative disaggregated compute system 600 is shown with reference now to FIG. 6. In one embodiment, the disaggregated compute system 600 is configured within a data center 605 in which a switching optically-connected memory architecture is used. This architecture was described above in the context of FIGS. 1-4, but it is not intended to be limiting. In the disaggregated compute system 600, there are shared server pools, e.g., a compute pool 602, a memory pool 604, an accelerator pool 606, a storage pool 608, and perhaps others. There may be a single instance of a resource pool, or multiple such instances (sometimes referred to as "multiple pools"). In the approach, particular servers that service customer workloads are constructed dynamically, for example, on-demand and based on workload requirements, by allocating from these resource pools. Thus, for example, a first server entity 610 may comprise CPU 602*a* (selected or otherwise obtained from compute pool 602), memory 604*b* (selected or otherwise obtained from memory pool 604), accelerator 606*c* (selected or otherwise obtained from accelerator pool 606), and storage 608*d* (selected or otherwise obtained from storage pool 608). A second server entity 612 may comprise CPU 602*b*, memory 604*a*, accelerator 606*b* and storage 608*a*. These examples are merely representative. The particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 600 has the capability to keep track of resources that are available in the shared server resource pools and that are allocated or de-allocated to the various server entities. To this end, the disaggregated compute system 600 comprises (or has associated therewith) a tracking system comprising a resource allocation mechanism 614, and an associated database system 616. Generally, the tracking system is implemented as a data processing system, and it may operate in a standalone manner or as a component of some other system or functionality in the data center.

Typically, the resource allocation mechanism 614 is implemented in software, namely, as set of computer program instructions, executing in one or more hardware processors. The resource allocation mechanism 614 may comprise one or more sub-systems or modules, processes, programs or execution threads, and such components may be co-located or distributed. The resource allocation mechanism 614 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources to the existing server entity when less capacity is needed to handle the workload. One or more of such functions may be combined, and other types of algorithms may be implemented by the resource allocation mechanism 614.

The one or more algorithms that comprise the resource allocation mechanism 614 used information stored in the database system 616 to carry out the management functions. As noted above, the database system 616 stores information that tracks the state, status or other properties and attributes of the various resources in the shared server pools. In addition, preferably the database stores information about each server entity built by the resource allocation mechanism. Generalizing, and as well-known, the database system 616 comprises a database 618, namely, a collection of data organized in one or more ways (e.g., via schemas, tables, queries, report, views and other objects), together with a database management system (DBMS) 620, which is a computer software application that interacts with the user, other applications, and the database to capture and analyze data. A general purpose DBMS enables the definition, creation, querying, update and administration of databases. A representative DBMS is IBM® DB2®.

In one embodiment, the database 618 is relational. The database stores a data record (or, more generally, a data set)

that, for each defined server entity, identifies the resources that comprise the server. Preferably, the data record is associated with an identifier, a unique server ID, and each resource the comprises the server is associated in the database with that unique server identifier. Thus, continuing with the example described above, the first server entity 610 may be associated with unique server $ID_1$, while the second server 612 may be associated with user server $ID_2$, and so forth.

Preferably, the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 602*a*, memory 604*b*, GPU accelerator 606*c* and storage 608*d* are associated (by relational tables or otherwise) with unique server ID1, which is the unique server identifier for the first server entity 610. Likewise, and continuing with the second example, the various resource-specific identifiers for the CPU 602*b*, memory 604*a*, GPU accelerator 606*b* and storage 610*a* are associated with unique server ID2, which is the unique server identifier for the second server entity, and so forth for each server entity.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

There may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 614 and the database system 616 work together to manage the disaggregated compute system. The resource allocation mechanism functions as a tracking system that keeps track of idle and used CPUs, memory, GPU accelerator and other components that define a server. Additionally, the tracking system keeps a record for each defined server of what CPUs, memory, accelerator or other components are part of the server. As noted, and for the each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

Multi-Tenant Memory Service for Memory Pool

According to this disclosure, the "disaggregated server" architecture of FIG. 6 is enhanced through a memory management service. As will be seen, the memory management service provides unique memory management capabilities for the memory pool, thereby enabling the memory pool (and thus the data center) to operate more efficiently and with increased performance and greater memory utilization.

A memory pool is assumed. As noted, in a disaggregate compute system of this type, memory components from the memory pool can be used, re-used or shared among different tenants and processing components. The memory management service may have responsibility for creating the memory pool, but this is not a requirement. Typically, the basic memory component that managed in the pool is a memory module allocation block (e.g., a DIMM module). This is not a limitation, however, as a memory component (or "resource") in the pool may be any other type of physical memory structure.

Figure 7:
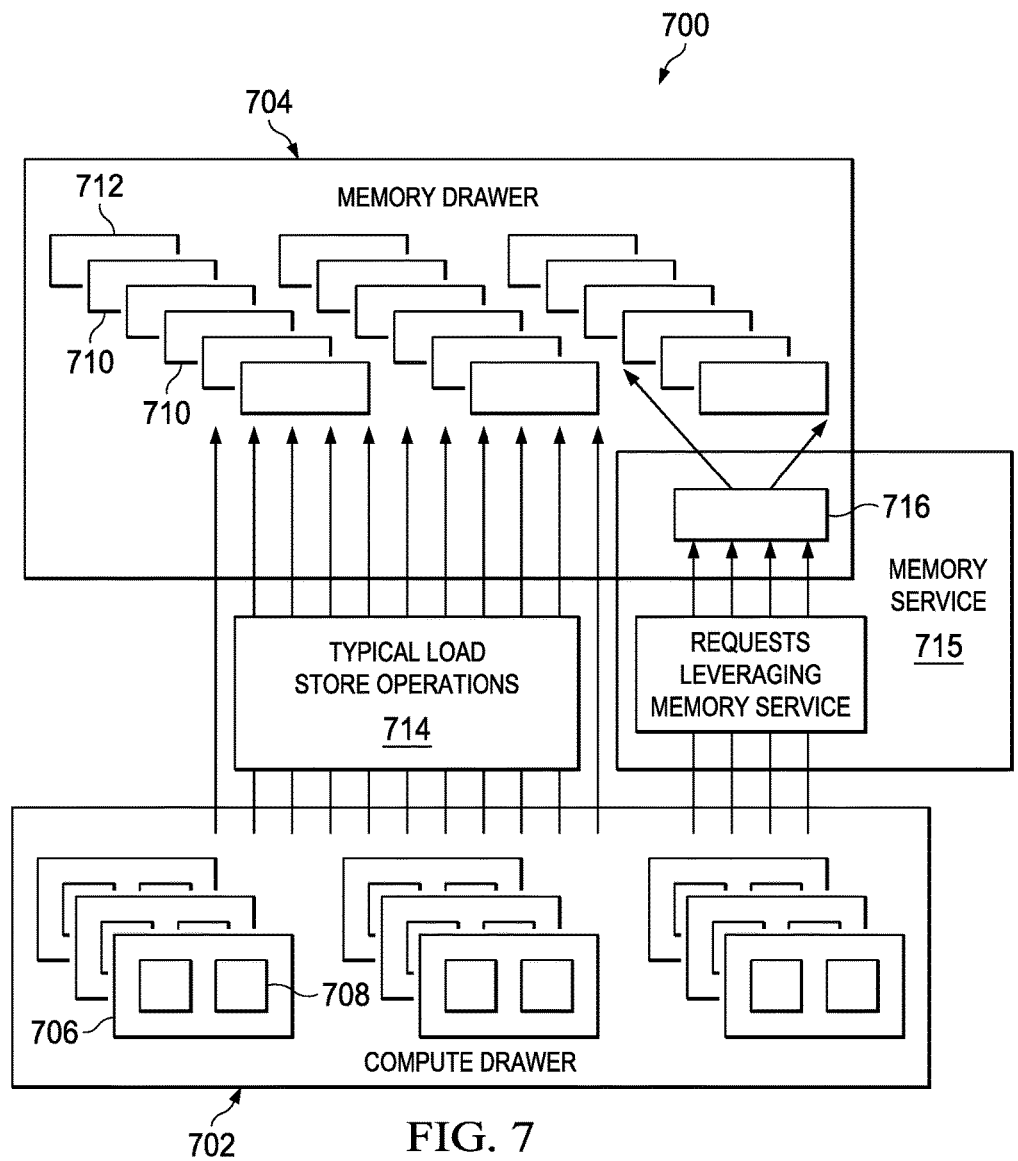
FIG. 7 depicts the data center in FIG. 6 augmented to include the memory management service according to a first embodiment of this disclosure.

The memory management service may be implemented by a "memory manager" component or mechanism. With reference now to FIG. 7, an implementation of the memory management service is depicted. In this example, a portion of the data center 700 is shown and includes a processor pool, identified as a "compute drawer" 702, and a memory pool, identified as a "memory drawer" 704. The compute drawer 702 includes blocks 706 of processors (typically CPUs), each of which typically includes one or more CPUs 708. The memory drawer 704 includes blocks 710 of memories, each of which typically includes one or more DIMM modules 712. Conventionally, typical load-store operations 714 are managed by other management functions, such as the resource allocation mechanism described above with respect to FIG. 6. According to this disclosure, the memory management service 715 includes a service processor 716 that facilitates the operations of the memory management service, as will be described. The service processor 716 may be a standalone mechanism, or it may be part of another memory controller. The service processor 716 comprises the memory service code that controls the service operations. This code comprises one or more computer programs (each including program instructions sets) that are executed in hardware to carry out the functions of the service. At a high level, the service processor operates to dynamically acquire (from the memory drawer 704) as much memory as it needs to carry out its functions. Preferably, the memory management service is operative with respect to workloads that are not optimized for efficient use of the load-store operations, although this is not a limitation.

Thus, as depicted in FIG. 7, a memory pool (memory drawer 704) is created and from which different memory modules can be allocated to different instances of processors 708 by the memory management service. Preferably, the service allocates memory modules 712 from the memory drawer with minimal granularity of allocation and thus sharing of bandwidth when possible. Although a memory module 712 might be assigned to be shared among two different instances of different users/tenants, typically this is undesirable as such shared usage has implications on the full bandwidth available from that module (in terms of read/write) if more than one tenant accesses that module at the same time. Thus, preferably a memory module gets assigned to one tenant at a time. Thus, different memory blocks are assigned to different tenants, with the memory service operable to switch a memory block from one bare metal service to another or to suspend it if there is no need other than to keep that instance warm and ready to resume very quickly when work starts. In this manner, the memory service provides for fast agility and elasticity per memory component.

Thus, and as depicted in FIG. 7, the memory service of this disclosure preferably occupies some configurable portion of the overall memory system (the memory pool), leaving the rest free for typical high-performance load-store operations. As also shown, requests that leverage the memory service 715 are managed by the processor 716, which operates as memory pool controller and, in particular, to provide optimized data organization capabilities over the pool of real memory already accessible to the system. To this end, the memory service provides for the capability to implement certain types of data stores in hardware, including at the data structure level. In a preferred embodiment, and as will be described, the memory service provides for storage capacity conservation by enabling the creation and management of high-performance, re-usable data structure implementations across the memory pool. Moreover, and will also be described, the service provides for various analytics (e.g., multi-tenant similarity, duplicate detection, and the like) to determine if and when the data organizations are worth doing. As will be seen, the service preferably increases data structure performance, and further leverages and reduces capacity needs through similarity and duplicate detection in the data structure (even between workloads) to save memory space.

As used herein, the notion of a "data structure" refers to an organization of data that a workload uses based on the way its need to access data. For example, some programmers may choose to put their data in a "linked list" if sequential access is the primary access method for the workload, or to put their data in a "hash table" if more random access is dominant. Other types of data structures include, without limitation, trees, arrays, stacks, queues, and the like. A data structure may be a hybrid of two or more data structure types. Generalizing, a data structure refers to a construct implemented to organize data in a workload. Typically, the choice of data structure is made by the programmer based on his or her understanding of the workload needs or requirements.

According to the techniques of this disclosure, and as will be further described, the memory service preferably performs various forms of data structure optimizations (when it makes sense to do so). In one data structure optimization, there may be an opportunity to reduce the space taken in aggregate by de-duplication and compression of data in the data structure. In another data structure optimization, the data structures may be tuned over time to ensure optimal performance for insertion and retrieval of data. Most of this latter tuning is typically directed at performance. For example, a hash table with too many entries for a particular hash value may be re-hashed, or a tree re-balanced, etc. Other optimizations of the data structure to increase performance of or conserve memory used by the data structure may also be implemented.

Thus, and as an example of how data structure performance may be optimized, the memory service selectively operates to re-align memory to different data structures that may be more efficient, e.g., given a particular data usage pattern and/or distribution of the data. To this end, preferably the memory manager monitors data usage patterns and data distribution and determines if and when to change (or supplement) the data structure that is currently in use. Known usage-based and distribution-based performance optimization schemes may be leveraged to support the memory service's re-alignment of data structures. Such usage-based optimization can include, without limitation, compression of cold data within the data structure, movement of very cold data to storage, pre-loading hot data in cache based on usage trends, and the like. Representative distribution-based optimization schemes include, without limitation, re-hashing algorithms applied to hash-based structures, re-balancing algorithms applied to tree-based structures, and the like.

Figure 8:
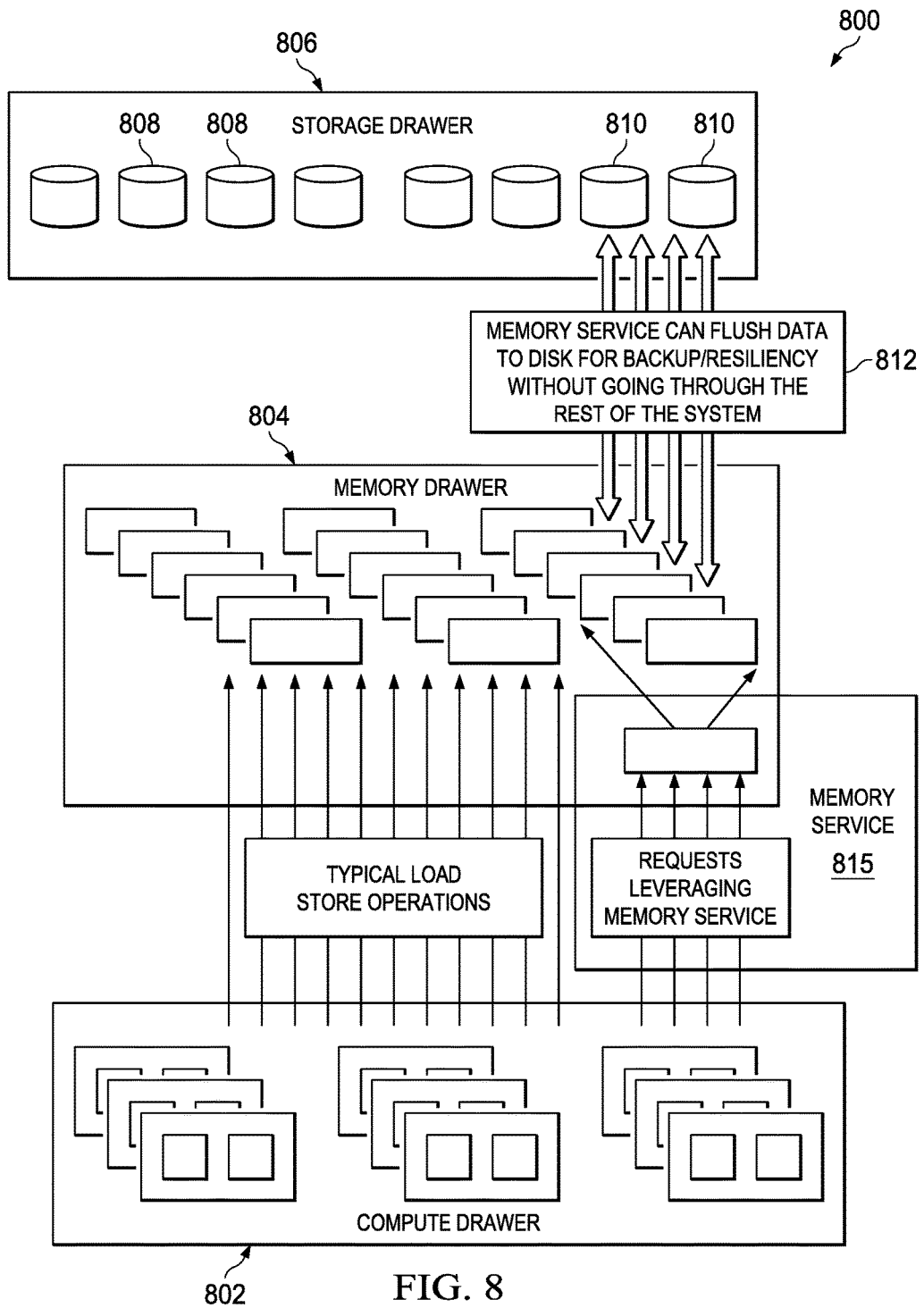
FIG. 8 depicts the data center according to a second embodiment of this disclosure.

A further aspect of the memory service provides for automated backup of the memory pool, e.g., to backup storage resources. FIG. 8 depicts this scenario. As shown in FIG. 8, the data center 800 includes the compute drawer 802 and the memory drawer 804, as well as the memory service 815. In addition, the data center includes a storage pool, identified as storage drawer 806, that comprises a set of data stores 808. At least some of the data stores 810 are provided for backup. To this end, the memory manager service 815 tracks and develops an understanding of data set organization by process or by a programmatic instruction from the workload. Periodic or directed backup operations 812 to the storage pool are then carried out at any time and with minimal disruption because (as depicted) the data copies do not need to go through the processors of the compute pool. Preferably, backups are carried out with respect to a particular data set. Non-cached data preferably is directly copied to backup storage, while cached data is flushed to main memory and then directly copied to backup storage. Alternatively, backups are configured to happen during events (e.g., page faults) where cache flushes are already occurring.

Thus, preferably the memory service manages the memory pool by providing one or more of: capacity conservation, performance optimization, and resiliency.

The following provides additional details of a preferred capacity conservation technique. In this approach, preferably data is stored in blocks with pointers. Common data blocks are then identified, e.g., through indexing and comparative analysis. When common data blocks are found, an analysis to determine their stability over time is performed. If the common data blocks are deemed stable (based on a configurable criteria), the memory service eliminates the duplicates and points its pointer to the first copy. This single copy of data, which is referred to as an oversubscribed value, is then managed (e.g., with the memory manager updating deltas of stable oversubscribed values as needed). If, however, the common data blocks are not deemed to be stable, then preferably no data elimination is done.

Figure 9:
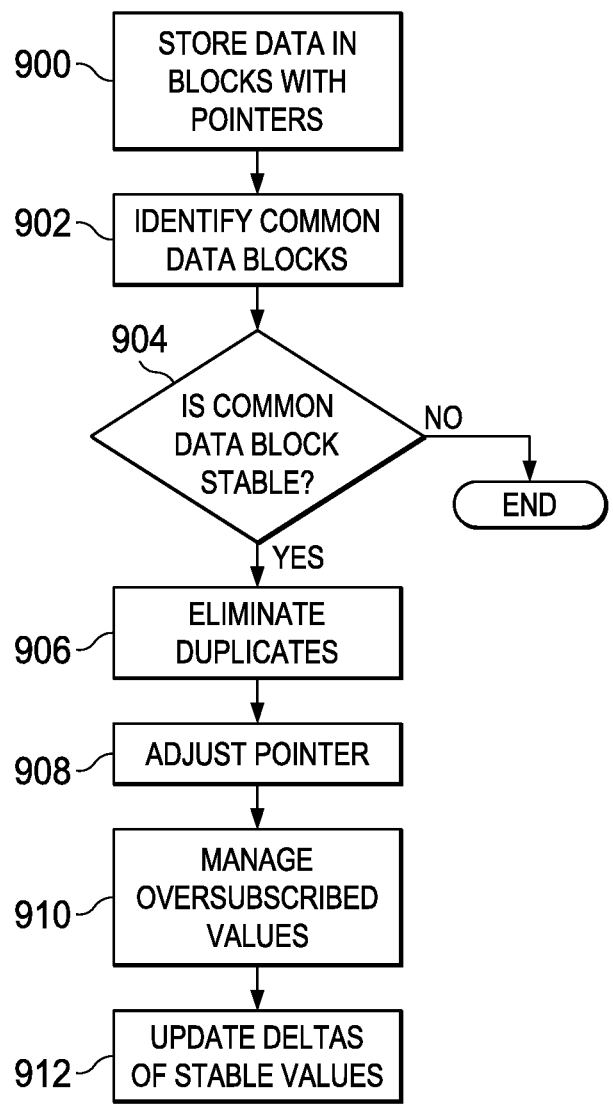
FIG. 9 depicts a process flow for a capacity conservation routine that uses similarity and duplicate detection in data structures to save memory space.

FIG. 9 depicts a process flow of the capacity conservation routine of this disclosure. Generally, and as noted above, the routine operates to leverage and reduce capacity needs through similarity and duplicate detection in the data structure to save memory space. The routine may operate with respect to a particular workload, or even across workloads. The process flow shown in FIG. 9 depicts the cross-workload example. The routine begins at step 900 with the data stored in blocks with pointers. At step 902, the common data blocks are identified, preferably through known indexing and comparative analysis schemes. At step 904, and for each common data block found, a test is performed to determine whether the common data block is stable over time. The nature of the criteria used to evaluate stability may vary, but typically step 904 tests to determine whether values in the common data block have changed over a configured time period, over a configured set of operations, or the like. If the outcome of the test at step 904 is positive, the common data block is deemed to be stable; control then branches to step 906 at which the memory service eliminates the duplicates. At step 908, the memory service points its pointer to the first copy, which is then referenced as an "oversubscribed value." If, however, the outcome of the test at step 904 is negative, the common data block is deemed to be unstable. The routine then terminates.

Although the oversubscribed value is assumed to be stable, there may be circumstances when one of the workloads needs to subsequently change the oversubscribed data value. In this situation, which is not expected to occur frequently, the memory service performs an analysis to determine if a delta of the oversubscribed value can be computed and stored more cheaply than storing a new value. If the delta value can be stored with a reduced size, it is created and the workload's pointer is then pointed to the delta. If the delta value is as big or almost as big as the original size, the oversubscribed location is then duplicated, and each is maintained as a separate value. This management of the oversubscribed value is depicted as step 910, which follows after step 908.

The manager also oversees the work required to update deltas of stable oversubscribed values. This is depicted as step 912. In particular, if one of the deltas changes too much (preferably using the same threshold at used in step 904) and is no longer stable, the manager breaks off the delta as a new value and its pointer is adjusted accordingly. If the value that is no longer stable is the base oversubscribed value, the manager performs an analysis to determine which delta is the most stable, and it becomes the new base value. The old base is then broken off into a separate non-oversubscribed value. If none of the deltas are stable, however, preferably they and the base value are all broken off into new unsubscribed values.

The approach provides significant advantages. The memory service provides high performance with an implementation close to the hardware. It enables building and re-use of data structures for memory pool control, thereby reducing inefficient, potentially insecure implementations generated by each workload. The approach facilitates highly-efficient steady state memory management operations through data organization. In particular, the memory service provides for highly-optimized data organization capabilities over the pool of real memory already accessible to the system. By managing the oversubscribed values (as described with respect to FIG. 9), the manager determines if the similarity and duplicate detection optimizations are worth doing giving the stability of the data, thereby preventing costly copies and recordkeeping. When these optimizations are used, they are carried out in-memory for optimized performance. Further, the automated backup capabilities provide for a hardware-enabled method of efficiently pulling data out of the memory pool for backup purposes. Preferably, no copies of data are made by the memory manager to facilitate its basic operations. The hardware structure also permits an efficient way of producing replicas without the costly operation of going through the processor.

The approach herein thus optimizes main memory usage in a disaggregated system, preferably by adding hardware-based implementations of data organization mechanisms (namely, data structure operation, data structure performance optimization, operational time, in-memory de-duplication, etc.) that enable improved cross-tenant utilization. In this manner, the memory service enables higher-level data organization capabilities to be offered to compute nodes over real memory. In this approach, it is not required that a range of memory be given to a compute node; rather, data organization capabilities (namely, collective data structures, etc.) are made available in a manner that enable backend optimizations to be leveraged in hardware and software. Moreover, the approach herein does not require multiple hosts or client/server installs to create a virtual memory system.

The advantages described herein are provided for by a memory management service that allocates a memory pool that can allocate different memory modules to different instances of processors. Memory service structures (which may be at the data structure level) are built to implement stores in hardware. An embodiment of the service further includes a capacity conservation function that leverages and reduces capacity needs, preferably through similarity and duplicate detection in the data structure. A still further embodiment of the service further provides for the ability to re-align memory to different data structures that may be more efficient given the usage pattern and distribution of the data. Yet a still further embodiment of the service also provides for automated backup and thus enhanced data resiliency, preferably by enabling backup operations to occur without requiring copies to go through the processor.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, such as data center architectures, disaggregate compute environments, and the like, as well as the specific technological improvements to memory pool management schemes, such as described above.

Having described our invention, what we now claim is as follows.

The invention claimed is:

1. A method of managing memory in a multi-tenant compute environment, comprising
providing a memory resource pool;
for a given workload, allocating memory resources from the memory resource pool to a set of processors;
organizing data for the given workload in the allocated memory resources according to a data structure; and
determining whether re-organization of the data in the data structure for the given workload would increase performance of the data structure or conserve memory used by the data structure; and
upon a determination that re-organization would increase performance or conserve memory, taking a given action to manage the data, wherein the given action detects data similarity or duplicates and, in response thereto, eliminates given data from the allocated memory resources;
wherein data similarity or duplicates are detected by:
identifying data blocks that are common to multiple tenants or multiple processes;
upon identifying common data blocks, determining whether the common data blocks are stable according to a configurable threshold;
upon a determination that the common data blocks are stable, eliminating duplicate common data blocks;
associating an instance of the common data blocks as a shared common data block; and
providing the multiple tenants or multiple processes a pointer to the shared common data block.

2. The method as described in claim 1, further including:
determining that a value for a shared common data block has changed for a first tenant;
determining whether it is computationally less expensive to store a delta value for the shared common data block for the first tenant; and
upon a determination that it is computationally less expensive, storing the delta value for the shared common data block for the first tenant.

3. The method as described in claim 2, further comprising:
determining whether it is computationally less expensive to store a new value for the shared common data block for the first tenant; and
upon a determination that it is computationally less expensive to store a new value, storing the new value for the shared common data block for the first the tenant.

4. The method as described in claim 1, wherein the given action to manage the data comprises:
monitoring data distribution or usage patterns of the data; and
based on the monitoring, applying an optimization to adjust the data structure.

5. The method as described in claim 1, further including:
profiling a data set to produce a data set schema;
periodically backing up the data set without using a processor; and
flushing cached data to main memory prior to a backup operation.

6. The method as described in claim 1 wherein the data structure organizes the data based on an access requirement of the given workload.

7. An apparatus of managing memory in a multi-tenant compute environment, comprising:
one or more hardware processors;
computer memory holding computer program instructions executed by the hardware processors and operative to:
organize a memory resource pool;
for a given workload, allocate memory resources from the memory resource pool to a set of processors;
organize data for the given workload in the allocated memory resources according to a data structure; and
determine whether re-organization of the data in the data structure for the given workload would increase performance of the data structure or conserve memory used by the data structure; and
upon a determination that re-organization would increase performance or conserve memory, take a given action to manage the data, wherein the given action detects data similarity or duplicates and, in response thereto, eliminates given data from the allocated memory resources;
wherein data similarity or duplicates are detected by:
identifying data blocks that are common to multiple tenants or multiple processes;
upon identifying common data blocks, determining whether the common data blocks are stable according to a configurable threshold;
upon a determination that the common data blocks are stable, eliminating duplicate common data blocks;
associating an instance of the common data blocks as a shared common data block; and
providing the multiple tenants or multiple processes a pointer to the shared common data block.

8. The apparatus as described in claim 7, wherein the computer program instructions are further operative to:
determine that a value for a shared common data block has changed for a first tenant;
determine whether it is computationally less expensive to store a delta value for the shared common data block for the first tenant; and
upon a determination that it is computationally less expensive, store the delta value for the shared common data block for the first tenant.

9. The apparatus as described in claim 8, wherein the computer program instructions are further operative to:
determine whether it is computationally less expensive to store a new value for the shared common data block for the first tenant; and
upon a determination that it is computationally less expensive to store a new value, store the new value for the shared common data block for the first the tenant.

10. The apparatus as described in claim 7, wherein the given action to manage the data comprises:
monitoring data distribution or usage patterns of the data; and
based on the monitoring, applying an optimization to adjust the data structure.

11. The apparatus as described in claim 7, wherein the computer program instructions are further operative to:
profile a data set to produce a data set schema;
periodically back-up the data set without using a processor; and
flush cached data to main memory prior to a backup operation.

12. The apparatus as described in claim 7 wherein the data structure organizes the data based on an access requirement of the given workload.

13. A computer program product in a non-transitory computer readable medium for use in a data processing system to manage memory in a multi-tenant compute environment, the computer program product holding computer program instructions executed in the data processing system and operative to:
organize a memory resource pool;
for a given workload, allocate memory resources from the memory resource pool to a set of processors;
organize data for the given workload in the allocated memory resources according to a data structure; and
determine whether re-organization of the data in the data structure for the given workload would increase performance of the data structure or conserve memory used by the data structure; and
upon a determination that re-organization would increase performance or conserve memory, take a given action to manage the data, wherein the given action detects data similarity or duplicates and, in response thereto, eliminates given data from the allocated memory resources;
wherein data similarity or duplicates are detected by:
identifying data blocks that are common to multiple tenants or multiple processes;
upon identifying common data blocks, determining whether the common data blocks are stable according to a configurable threshold;
upon a determination that the common data blocks are stable, eliminating duplicate common data blocks;
associating an instance of the common data blocks as a shared common data block; and
providing the multiple tenants or multiple processes a pointer to the shared common data block.

14. The computer program product as described in claim 13, wherein the computer program instructions are further operative to:
determine that a value for a shared common data block has changed for a first tenant;
determine whether it is computationally less expensive to store a delta value for the shared common data block for the first tenant; and
upon a determination that it is computationally less expensive, store the delta value for the shared common data block for the first tenant.

15. The computer program product as described in claim 14, wherein the computer program instructions are further operative to:
determine whether it is computationally less expensive to store a new value for the shared common data block for the first tenant; and
upon a determination that it is computationally less expensive to store a new value, store the new value for the shared common data block for the first the tenant.

16. The computer program product as described in claim 13, wherein the given action to manage the data comprises:
monitoring data distribution or usage patterns of the data; and
based on the monitoring, applying an optimization to adjust the data structure.

17. The computer program product as described in claim 13, wherein the computer program instructions are further operative to:
profile a data set to produce a data set schema;
periodically back-up the data set without using a processor; and
flush cached data to main memory prior to a backup operation.

18. The computer program product as described in claim 13 wherein the data structure organizes the data based on an access requirement of the given workload.

19. A data center facility, comprising:
- a memory pool;
- an optical interconnect; and
- a memory manager executing in a hardware element and operative to manage allocation of memory resources from the memory resource pool to a set of processors for multiple tenant workloads, to organize data for a given tenant workload according to a data structure, and to selectively re-organize the data in the data structure to increase performance of the data structure or reduce memory required to service the given tenant workload by taking a given action to manage the data, wherein the given action detects data similarity or duplicates and, in response thereto, eliminates given data from allocated memory resources, wherein data similarity or duplicates are detected by:
  - identifying data blocks that are common to multiple tenants or multiple processes;
  - upon identifying common data blocks, determining whether the common data blocks are stable according to a configurable threshold;
  - upon a determination that the common data blocks are stable, eliminating duplicate common data blocks;
  - associating an instance of the common data blocks as a shared common data block; and
  - providing the multiple tenants or multiple processes a pointer to the shared common data block.

* * * * *